(12) United States Patent
Gerstenberger et al.

(10) Patent No.: US 9,746,069 B2
(45) Date of Patent: Aug. 29, 2017

(54) AXLE ASSEMBLY

(71) Applicant: AMERICAN AXLE & MANUFACTURING, INC., Detroit, MI (US)

(72) Inventors: Jeffrey L. Gerstenberger, Detroit, MI (US); Gregory J. Hilker, Canton, MI (US); William G. Hunt, Tecumseh, MI (US); Eugene A. Rodden, Detroit, MI (US); Blair J. Swanson, Detroit, MI (US); Gregory E. Woodside, Rochester Hills, MI (US); James M. Purington, Pinckney, MI (US); Libu M. Thamarappallil, Windsor, CA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 44 days.

(21) Appl. No.: 14/782,347

(22) PCT Filed: Apr. 1, 2014

(86) PCT No.: PCT/US2014/032464
§ 371 (c)(1),
(2) Date: Oct. 5, 2015

(87) PCT Pub. No.: WO2014/165474
PCT Pub. Date: Oct. 9, 2014

(65) Prior Publication Data
US 2016/0033029 A1 Feb. 4, 2016

Related U.S. Application Data

(60) Provisional application No. 61/819,892, filed on May 6, 2013, provisional application No. 61/808,945, filed on Apr. 5, 2013.

(51) Int. Cl.
*F16H 57/04* (2010.01)
*B60B 35/16* (2006.01)
(Continued)

(52) U.S. Cl.
CPC ....... *F16H 57/0483* (2013.01); *B60B 35/125* (2013.01); *B60B 35/163* (2013.01);
(Continued)

(58) Field of Classification Search
CPC ............ F16H 57/0483; F16H 57/0479; F16H 57/0471
See application file for complete search history.

(56) References Cited

U.S. PATENT DOCUMENTS

| 3,887,037 A | 6/1975 | Haluda et al. |
| 2010/0144480 A1 | 6/2010 | Downs et al. |
| 2011/0064344 A1* | 3/2011 | Shibagaki ............. F16C 33/664 384/462 |

FOREIGN PATENT DOCUMENTS

| JP | 2006064056 A | 3/2006 |
| JP | 2007315456 A * | 12/2007 ............. F16H 57/04 |

(Continued)

OTHER PUBLICATIONS

International Search Report and Written Opinion for PCT/US2014/032464, mailed Aug. 4, 2014; ISA/KR.

*Primary Examiner* — Huan Le
(74) *Attorney, Agent, or Firm* — Harness, Dickey & Pierce, P.L.C.

(57) ABSTRACT

An axle assembly that is configured with reduced weight and an internal configuration that is configured to reduce losses through, for example, higher efficiency gearing, low viscosity lubricant and reduced lubricant levels as compared with current production automotive axle assemblies that are configured with a similar overall gear ratio and capacity.

24 Claims, 3 Drawing Sheets

(51) Int. Cl.
*F16H 57/037* (2012.01)
*B60B 35/12* (2006.01)
*B60B 35/18* (2006.01)
*F16H 48/38* (2012.01)
*F16H 48/42* (2012.01)

(52) U.S. Cl.
CPC ............ *B60B 35/18* (2013.01); *F16H 48/38* (2013.01); *F16H 57/037* (2013.01); *F16H 57/045* (2013.01); *F16H 57/0409* (2013.01); *F16H 57/0424* (2013.01); *F16H 57/0471* (2013.01); *F16H 57/0479* (2013.01); *F16H 57/0495* (2013.01); *F16H 2048/423* (2013.01)

(56) References Cited

FOREIGN PATENT DOCUMENTS

| | | | |
|---|---|---|---|
| JP | 2009174682 A | 8/2009 | |
| JP | 2012197865 A | 10/2012 | |

* cited by examiner

AXLE ASSEMBLY

CROSS-REFERENCE TO RELATED APPLICATIONS

This application claims the benefit of U.S. Provisional Patent Application No. 61/808,945 filed Apr. 5, 2013 and U.S. Provisional Patent Application No. 61/819,892 filed May 6, 2013, the disclosures of which are incorporated by reference as if fully set forth in detail herein.

FIELD

The present disclosure relates to an axle assembly.

BACKGROUND

This section provides background information related to the present disclosure which is not necessarily prior art.

Modern commercial automotive axle assemblies tend to be designed in a very robust manner utilizing standard efficiency gearsets and heavy weight lubricants. While such axle assemblies have proven satisfactory for their intended use, they nevertheless remain susceptible to improvement.

SUMMARY

This section provides a general summary of the disclosure, and is not a comprehensive disclosure of its full scope or all of its features.

In one form the present teachings provide an axle assembly that includes a carrier housing, an input pinion having a plurality of pinion teeth, a first pair of bearings, a differential assembly, a second pair of bearings, a ring gear and a lubricant. The first pair of bearings supports the input pinion relative to the carrier housing for rotation about a first axis. The first pair of bearings are angular contact bearings or low friction tapered bearings. The differential assembly has a differential case and a differential gearset that is mounted to the differential case. The second pair of bearings supports the differential case relative to the carrier housing for rotation about a second axis that is transverse to the first axis. The second pair of bearings are angular contact bearings or low friction tapered bearings. The ring gear is mounted to the differential case for common rotation about the second axis. The ring gear has a plurality of ring gear teeth that are meshingly engaged with the pinion teeth. The ring gear teeth define a pitch diameter. The lubricant is received in the carrier housing and has a kinematic viscosity that is less than or equal to 12 cSt per ASTM test procedure D445-12 when a temperature of the lubricant is 100 degrees Celsius. The carrier housing defines a first sump, a second sump and a first reservoir. The first sump is configured to hold a first portion of the lubricant such that the ring gear rotates through the first portion of the lubricant during operation of the axle assembly. The second sump receives lubricant slung from the ring gear as the ring gear rotates in a predetermined rotational direction above a predetermined rotational speed. The second sump has a first drain, which is configured to drain lubricant received in the second sump into the first reservoir. The first reservoir provides lubricant to a first one of the first bearings when the ring gear rotates in the predetermined first direction. The ring gear and the input pinion are a hypoid gear system having an offset that is less than 10% of the pitch diameter of the ring gear teeth. At least one of the ring gear teeth and the pinion teeth has a non-directional surface roughness that is between 0.4 μm Ra and 0.01 μm Ra.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
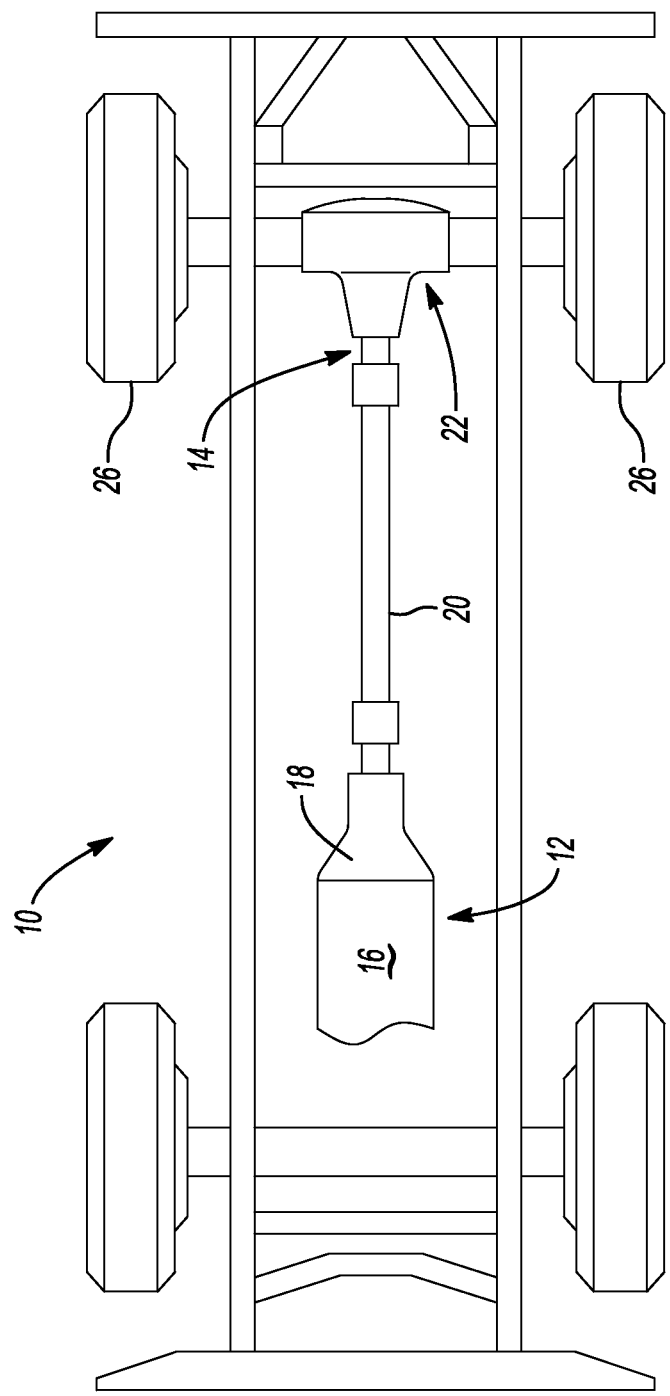
FIG. 1 is a schematic illustration of a vehicle having an exemplary axle assembly (e.g., rear axle assembly) constructed in accordance with the teachings of the present disclosure.

With reference to FIG. 1 of the drawings, an exemplary vehicle having an axle assembly (e.g., a rear axle assembly) constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a prop shaft 20 and a rear axle assembly 22. The propshaft 20 can couple the transmission 18 to the rear axle assembly 22 such that rotary power output of the transmission 18 is received by the rear axle assembly 22. The rear axle assembly 22 can distribute the rotary power to the rear vehicle wheels 26.

Figure 2:
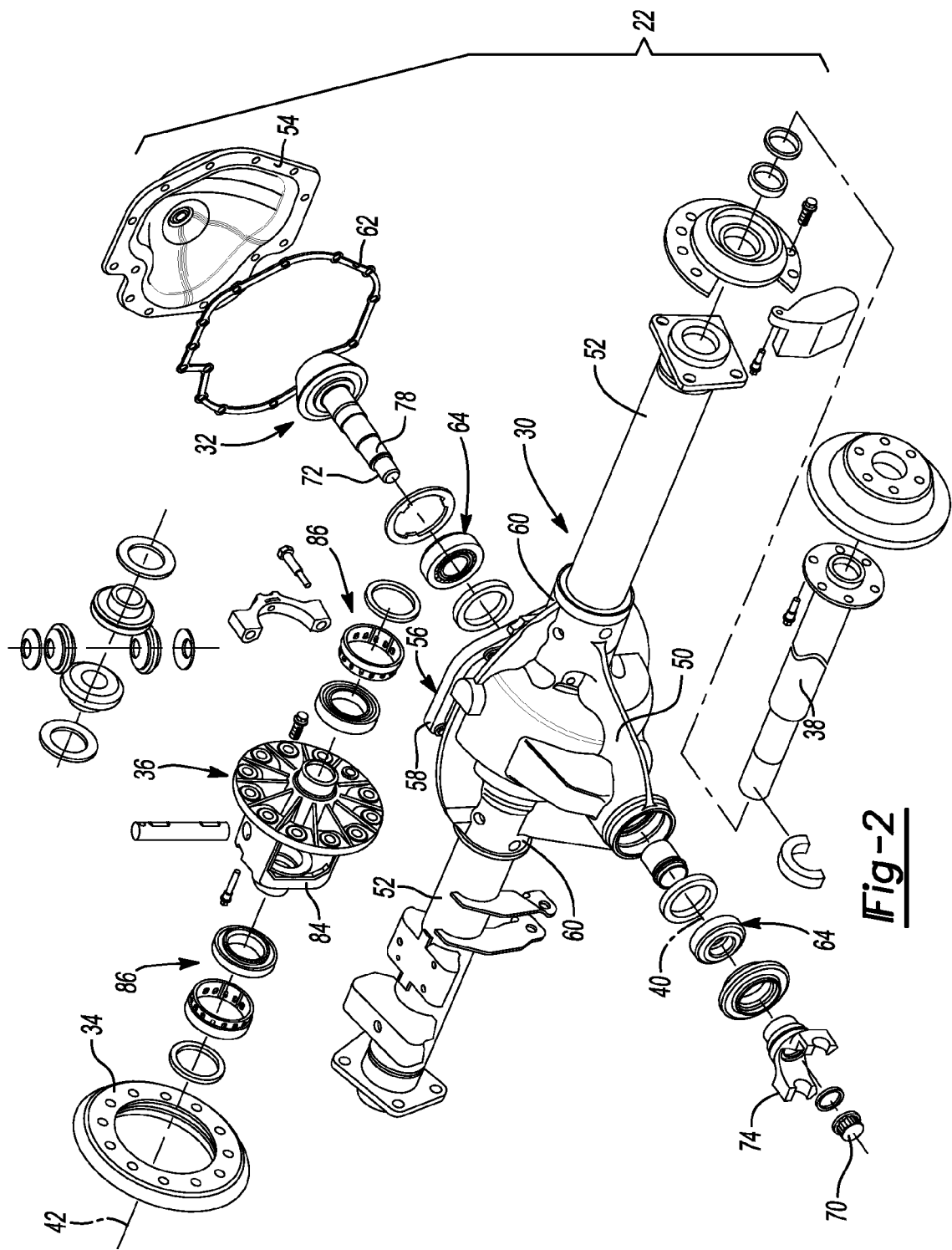
FIG. 2 is an exploded perspective view of a portion of the vehicle of FIG. 1 illustrating the rear axle assembly in more detail.

With reference to FIG. 2, the rear axle assembly 22 can include a housing 30, an input pinion 32, a ring gear 34, a differential assembly 36, and a pair of axle shafts 38 (only one shown). The input pinion 32 can be rotatable about a first axis 40, while the ring gear 34 and the differential assembly 36 can be rotatable about a second axis 42 that can be transverse (e.g., perpendicular) to the first axis 40.

The housing 30 can comprise a carrier housing 50, a pair of axle tubes 52 and a cover 54. The carrier housing 50 can be formed of any desired material, such as aluminum, and can define a central chamber 56, a cover flange 58, and a pair of tube mounts 60. Each of the axle tubes 52 can be received into a corresponding one of the tube mounts 60 and fixedly coupled to the carrier housing 50. For example, each axle tube 52 can be press-fit into one of the tube mounts 60 and one or more conventional slug welds (not specifically shown) can be employed to axially and rotationally secure each axle tube 52 to its tube mount 60. The cover 54 can be mounted to the cover flange 58 to close the access to the central chamber 56. A gasket 62 can be disposed between the cover 54 and the cover flange 58.

The input pinion 32 can be received in the central chamber 56 and mounted on a set of pinion bearings 64 for rotation about the first axis 40. The pinion bearings 64 can be any suitable type of bearing, such as angular contact ball bearings and/or low friction tapered bearings. It will be appreciated that the pinion bearings 64 can be preloaded as part of the installation of the input pinion 32. Any means or method may be employed to preload the pinion bearings 64, such as the tightening of a nut 70 onto a threaded portion 72 of the input pinion 32 to generate a clamping force that is transmitted through a companion flange 74 to an inner race of one of the pinion bearings 64. The nut 70 and the threaded portion 72 can have relatively fine-pitched threads. The companion flange 74 is mounted onto a shaft portion 78 of the input pinion 32 in a slip-fit manner. A series of circumferentially spaced apart centering protrusions (not shown) on the shaft portion 78 cooperate with the companion flange 74 to position the companion flange 74 concentrically about the shaft portion 78. Construction in this manner permits a magnitude of the torque that is applied to the nut 70 (to tighten the companion flange 74 against the inner bearing race) to more accurately reflect the preload on the pinion bearings 64.

The differential assembly 36 can include a differential case 84 that can be received in the central chamber 56. The differential case 84 can be mounted on a set of differential bearings 86 for rotation about the second axis 42. The differential bearings 86 can be angular contact ball bearings or low friction tapered bearings. The ring gear 34 can be fixedly coupled to the differential case 84 and meshingly engaged to the input pinion 32. In the particular example provided, the ring gear 34 is welded (e.g., laser welded) to the differential case, but other coupling means, such as threaded fasteners, could be employed in the alternative. The input pinion 32 and the ring gear 34 can be configured as a hypoid bevel gearset and can have a relatively small hypoid offset, such as a hypoid offset that is less than 10% of the pitch diameter of the ring gear 34 and preferably less than 8% of the pitch diameter of the ring gear 34. In the particular example provided, the ring gear 34 has a pitch diameter of 218 mm, the hypoid offset is 15 mm so that the hypoid offset is 6.9% of the pitch diameter of the ring gear 34.

The input pinion 32 can have relatively fine teeth so that load transmitted between the input pinion 32 and the ring gear 34 can be spread over several teeth. In the particular example provided, the input pinion 32 has 14 teeth and the ring gear 34 has 43 teeth so that the ratio of ring gear teeth to pinion teeth is 3.07.

The teeth on the input pinion 32 and/or the ring gear 34 can have a relatively high or smooth surface finish. In the particular example provided, an isotropic superfinish process by REM Chemicals, Inc. of Southington, Conn. was employed to provide the teeth of the input pinion 32 and the ring gear 34 with a non-directional, low surface roughness (Ra) finish that is between about 0.4 μm (16 μin) to about 0.01 μm (0.5 μin), such as a finish with a surface roughness that is less than or equal to about 0.2 μm (8 μin), preferably less than or equal to about 0.05 μm (2 μin), and more preferably less than or equal to about 0.025 μm (1 μin). It will be appreciated, however, that other processes such as lapping, polishing, or grinding could be employed in the alternative, especially when other surface finishes are desired.

Figure 3:
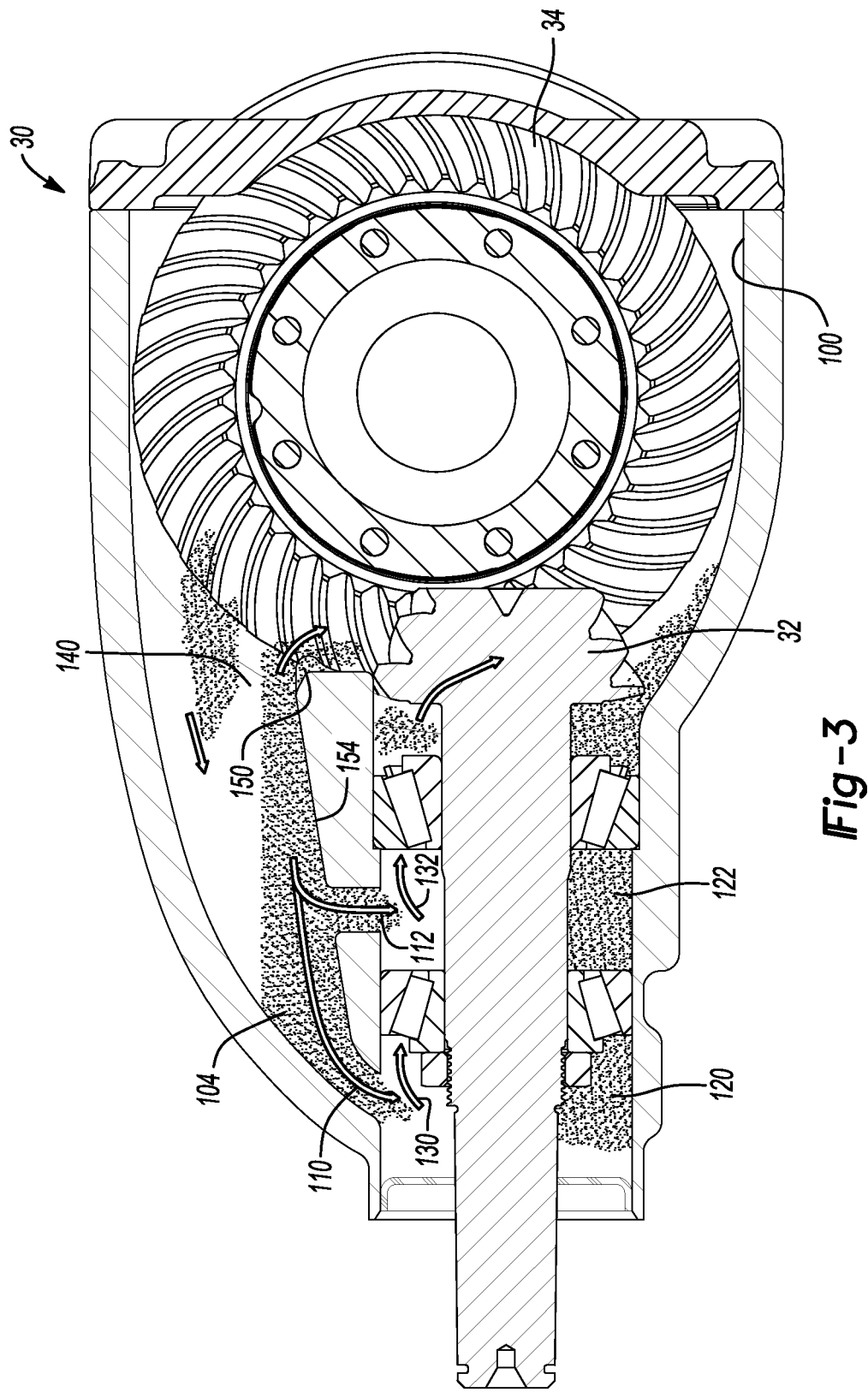
FIG. 3 is a section view through a portion of the axle assembly of FIG. 2.

With reference to FIG. 3, a suitable lubricant is disposed in a first sump 100 defined by the housing 30. During operation of the vehicle 10 (FIG. 1) in a forward direction, lubricant in the first sump 100 clings to the ring gear 34 as it rotates through the lubricant in the first sump 100; a portion of the lubricant that clings to the ring gear 34 can be slung from the ring gear 34 onto a second sump 104 that is disposed vertically above the first sump 100 and over the top of the input pinion 32. The second sump 104 can include first and second sump drains 110 and 112 that can be coupled in fluid connection to first and second lubricant reservoirs 120 and 122, respectively. The first lubricant reservoir 120 can be employed to hold a desired quantity of the lubricant for lubricating one of the pinion bearings 64 (i.e., a tail bearing) and an oil seal (not shown), while the second lubricant reservoir 122 can be employed to hold a desired quantity of the lubricant for lubricating another one of the pinion bearings 64 (i.e., a head bearing). First and second reservoir drains 130 and 132 can be coupled in fluid communication with the first and second lubricant reservoirs 120 and 122, respectively, that can permit excess lubricant in the first and second lubricant reservoirs 120 and 122 to be discharged to the first sump 100. Optionally, the first reservoir drain 130 can be coupled in fluid communication to the second lubricant reservoir 122.

The first and second sump drains 110 and 112 can be sized such that when the vehicle 10 (FIG. 1) is operated in a given direction over a predetermined speed, such as forward at 15 miles per hour, lubricant is directed into the second sump 104 (via the ring gear 34) faster than the lubricant in the second sump 104 can drain from the first and second sump drains 110 and 112. Excess lubricant in the second sump 104 can be directed to one or both of the differential bearings 86 (e.g., via galleries on or in the carrier housing as described in commonly assigned U.S. Pat. No. 8,512,193, the disclosure of which is incorporated by reference as if fully set forth in detail herein) and/or to the teeth of the pinion gear 32 and/or the ring gear 34. In the example provided, lubricant in the second sump 104 in excess of a first amount is directed via channels or ribs 140 (only one shown) to the differential bearings 86 (FIG. 2) and lubricant in the second sump 104 in excess of a second amount is directed via a spout 150 onto the teeth of the input pinion 32 at a point just prior to where the teeth of the input pinion 32 and the ring gear 34 are meshed together. In the particular example provided, the second sump 104 is defined in part by a sloped floor 154 that tapers between the second sump drain 112, an inlet to the ribs 140, and the spout 150 such that the inlet to the ribs 140 is disposed vertically between the spout 150 and the second sump drain 112. The size and positioning of the various outlets from the second sump 104 (i.e., the first and second sump drains 110 and 112, the inlets to the ribs 140 and the spout 150) are configured to feed lubricant to the pinion bearings 64 (FIG. 2), the differential bearings 86 (FIG. 2) and the gear teeth of the input pinion 32 and the ring gear 34 in a controlled manner that ensures proper lubrication while reducing or minimizing "churning losses" associated with the rotation of the ring gear 34 through the lubricant in the first sump 100 and reducing or minimizing "churning losses" in the pinion bearings 64. For example, the first and second reservoir drains 130 and 132 ensure that the pinion bearings 64 are not flooded by lubricant so that "churning losses" are reduced or minimized but the pinion bearings 64 are well lubricated. Construction in this manner so as to provide more direct lubrication of the various bearings and meshing teeth permits a relatively smaller volume of lubricant to be employed in the axle assembly as compared with modern commercially-available automotive axle assemblies.

The lubricant can be any suitable lubricant that is configured for use in a final drive with a hypoid pinion gear. We presently prefer a lubricant that is suited for a hypoid spiral bevel gear arrangement having a relatively low kinematic viscosity that is less than or equal to about 12 cSt, such as a lubricant having a kinematic viscosity that is less than or equal to about 10 cSt, preferably a lubricant having a kinematic viscosity that is less than or equal to about 8 cSt, more preferably a lubricant having a kinematic viscosity that is less than or equal to about 6 cSt, and still more preferably a lubricant having a kinematic viscosity that is less than or equal to about 5.7 cSt. All kinematic viscosities provided herein are taken at 100 degrees C. per ASTM test procedure D445-12.

It will be appreciated that an axle assembly constructed in accordance with the teachings of the present disclosure can have reduced weight and an internal configuration that provides lower losses as compared to a current production automotive axle assembly having a cast iron carrier housing. Lower losses can be provided, for example, through higher efficiency gearing, the use of low viscosity lubricant and a reduction in the amount of lubricant held by the axle assembly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
a carrier housing;
an input pinion having a plurality of pinion teeth;
a first pair of bearings supporting the input pinion relative to the carrier housing for rotation about a first axis, the first pair of bearings being selected from a group consisting of angular contact bearings and low friction tapered bearings;
a differential assembly having a differential case and a differential gearset that is mounted to the differential case;
a second pair of bearings supporting the differential case relative to the carrier housing for rotation about a second axis that is transverse to the first axis, the second pair of bearings being selected from a group consisting of angular contact bearings and low friction tapered bearings;
a ring gear mounted to the differential case for common rotation about the second axis, the ring gear having a plurality of ring gear teeth that are meshingly engaged with the pinion teeth, the ring gear teeth defining a pitch diameter; and
a lubricant received in the carrier housing, the lubricant having a kinematic viscosity that is less than or equal to 12 cSt per ASTM test procedure D445-12 when a temperature of the lubricant is 100 degrees Celsius;
wherein the carrier housing defines a first sump, a second sump, and a first reservoir, the first sump being configured to hold a first portion of the lubricant such that the ring gear rotates through the first portion of the lubricant during operation of the axle assembly, the second sump receiving lubricant slung from the ring gear as the ring gear rotates in a predetermined rotational direction above a predetermined rotational speed, the second sump having a first drain and a second drain, the first drain being configured to drain lubricant received in the second sump into the first reservoir, the first reservoir providing lubricant to a first one of the first pair of bearings when the ring gear rotates in the predetermined rotational direction, wherein lubricant in the second sump that drains from the second drain lubricates at least one of the second pair of bearings;
wherein the ring gear and the input pinion are a hypoid gear system having an offset and wherein the offset is less than 10% of the pitch diameter of the ring gear teeth; and
wherein at least one of the ring gear teeth and the pinion teeth has a non-directional surface roughness that is between 0.4 µm Ra and 0.01 µm Ra.

2. The axle assembly of claim 1, wherein the non-directional surface roughness is between 0.2 µm Ra to 0.01 µm Ra.

3. The axle assembly of claim 2, wherein the non-directional surface roughness is between 0.05 µm Ra to 0.01 µm Ra.

4. The axle assembly of claim 3, wherein the non-directional surface roughness is between 0.025 µm Ra to 0.01 µm Ra.

5. The axle assembly of claim 1, wherein the offset is less than 8% of the pitch diameter of the ring gear teeth.

6. The axle assembly of claim 5, wherein the offset is 6.9% of the pitch diameter of the ring gear teeth.

7. The axle assembly of claim 1, wherein the carrier housing is formed of aluminum.

8. The axle assembly of claim 7, further comprising a pair of tubes that are received into opposite ends of the carrier housing, each of the tubes being concentric about the second axis.

9. The axle assembly of claim 1, wherein the second sump is configured to discharge excess lubricant in the second sump onto at least one of the pinion teeth and the ring gear teeth.

10. The axle assembly of claim 1, wherein the second sump is configured to discharge excess lubricant in the second sump onto at least one of the pinion teeth and the ring gear teeth.

11. The axle assembly of claim 1, wherein the second sump is configured to discharge excess lubricant in the second sump onto at least one of the second pair of bearings.

12. The axle assembly of claim 1, wherein the kinematic viscosity is less than or equal to 10 cSt per ASTM test procedure D445-12 when the temperature of the lubricant is 100 degrees Celsius.

13. The axle assembly of claim 12, wherein the kinematic viscosity is less than or equal to 8 cSt per ASTM test procedure D445-12 when the temperature of the lubricant is 100 degrees Celsius.

14. The axle assembly of claim 13, wherein the kinematic viscosity is less than or equal to 6 cSt per ASTM test procedure D445-12 when the temperature of the lubricant is 100 degrees Celsius.

15. The axle assembly of claim 14, wherein the kinematic viscosity is less than or equal to 5.7 cSt per ASTM test procedure D445-12 when the temperature of the lubricant is 100 degrees Celsius.

16. The axle assembly of claim 1, wherein the first reservoir includes a first reservoir drain that is configured to permit excess lubricant in the first reservoir to be discharged to the first sump.

17. An axle assembly comprising:
a carrier housing that is formed of aluminum;
an input pinion having a plurality of pinion teeth;
a first pair of bearings supporting the input pinion relative to the carrier housing for rotation about a first axis, the first pair of bearings being selected from a group consisting of angular contact bearings and low friction tapered bearings;
a differential assembly having a differential case and a differential gearset that is mounted to the differential case;
a second pair of bearings supporting the differential case relative to the carrier housing for rotation about a second axis that is transverse to the first axis, the second pair of bearings being selected from a group consisting of angular contact bearings and low friction tapered bearings;
a pair of tubes that are received into opposite ends of the carrier housing, each of the tubes being concentric about the second axis;
a ring gear mounted to the differential case for common rotation about the second axis, the ring gear having a plurality of ring gear teeth that are meshingly engaged with the pinion teeth, the ring gear teeth defining a pitch diameter; and
a lubricant received in the carrier housing, the lubricant having a kinematic viscosity that is less than or equal to 10 cSt per ASTM test procedure D445-12 when a temperature of the lubricant is 100 degrees Celsius;
wherein the carrier housing defines a first sump, a second sump and a first reservoir, the first sump being configured to hold a first portion of the lubricant such that during operation of the axle assembly, the ring gear rotates through the first portion of the lubricant, the second sump receiving lubricant slung from the ring gear as the ring gear rotates in a predetermined rotational direction above a predetermined rotational speed, the second sump having first and second drains, the first drain being configured to drain lubricant received in the second sump into the first reservoir, the second drain being configured to drain lubricant from the second sump to lubricate at least one of the second pair of bearings, the first reservoir providing lubricant to a first one of the first pair of bearings when the ring gear rotates in the predetermined rotational direction;
wherein the ring gear and the input pinion are a hypoid gear system having an offset and wherein the offset is less than 8% of the pitch diameter of the ring gear teeth;
wherein the second sump is configured to discharge excess lubricant in the second sump onto at least one of the pinion teeth and the ring gear teeth;
wherein the pinion teeth of the input pinion mesh with at least three of the ring gear teeth; and
wherein at least one of the ring gear teeth and the pinion teeth has a non-directional surface roughness that is between 0.05 μm Ra to 0.01 μm Ra.

18. The axle assembly of claim 17, wherein the non-directional surface roughness is between 0.025 μm Ra to 0.01 μm Ra.

19. The axle assembly of claim 17, wherein the offset is 6.9% of the pitch diameter of the ring gear teeth.

20. The axle assembly of claim 17, wherein the kinematic viscosity is less than or equal to 8 cSt per ASTM test procedure D445-12 when the temperature of the lubricant is 100 degrees Celsius.

21. The axle assembly of claim 20, wherein the kinematic viscosity is less than or equal to 6 cSt per ASTM test procedure D445-12 when the temperature of the lubricant is 100 degrees Celsius.

22. The axle assembly of claim 21, wherein the kinematic viscosity is less than or equal to 5.7 cSt per ASTM test procedure D445-12 when the temperature of the lubricant is 100 degrees Celsius.

23. The axle assembly of claim 17, wherein the first reservoir includes a first reservoir drain that is configured to permit excess lubricant in the first reservoir to be discharged to the first sump.

24. An axle assembly comprising:
a carrier housing;
an input pinion having a plurality of pinion teeth;
a first pair of bearings supporting the input pinion relative to the carrier housing for rotation about a first axis, the first pair of bearings being selected from a group consisting of angular contact bearings and low friction tapered bearings;
a differential assembly having a differential case and a differential gearset that is mounted to the differential case;
a second pair of bearings supporting the differential case relative to the carrier housing for rotation about a second axis that is transverse to the first axis, the second pair of bearings being selected from a group consisting of angular contact bearings and low friction tapered bearings;
a ring gear mounted to the differential case for common rotation about the second axis, the ring gear having a plurality of ring gear teeth that are meshingly engaged with the pinion teeth, the ring gear teeth defining a pitch diameter, the ring gear and the input pinion being a hypoid gear system having an offset and wherein the offset is less than 10% of the pitch diameter of the ring gear teeth; and
a lubricant received in the carrier housing, the lubricant having a kinematic viscosity that is less than or equal to 12 cSt per ASTM test procedure D445-12 when a temperature of the lubricant is 100 degrees Celsius;
wherein the carrier housing defines a first sump, a second sump, a first reservoir and a second reservoir, the first sump being configured to hold a first portion of the lubricant such that the ring gear rotates through the first portion of the lubricant during operation of the axle assembly, the second sump receiving lubricant slung from the ring gear as the ring gear rotates in a predetermined rotational direction above a predetermined rotational speed, the second sump having a first drain and a second drain, the first drain being configured to drain lubricant received in the second sump into the first reservoir, the first reservoir providing lubricant to a first one of the first pair of bearings when the ring gear rotates in the predetermined rotational direction, the second drain being configured to drain lubricant received in the second sump into the second reservoir, the second reservoir providing lubricant to a second one of the first pair of bearings when the ring gear rotates in the predetermined rotational direction, the first and second reservoirs being axially spaced apart by the second one of the first pair of bearings; and wherein at least one of the ring gear teeth and the pinion teeth has a non-directional surface roughness that is between 0.4 µm Ra and 0.01 µm Ra.

\* \* \* \* \*

UNITED STATES PATENT AND TRADEMARK OFFICE
CERTIFICATE OF CORRECTION

PATENT NO. : 9,746,069 B2  
APPLICATION NO. : 14/782347  
DATED : August 29, 2017  
INVENTOR(S) : Jeffrey L. Gerstenberger et al.

Page 1 of 1

It is certified that error appears in the above-identified patent and that said Letters Patent is hereby corrected as shown below:

On the Title Page

Column 1, (72) Inventors, In Line 9, delete "CA (US)" and insert --(CA)--, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*